US012681126B2

(12) United States Patent
Chanclou

(10) Patent No.: US 12,681,126 B2
(45) Date of Patent: Jul. 14, 2026

(54) DELAY PROCESSING FOR A GEOLOCATION MEASUREMENT

(71) Applicant: Orange, Issy-les-Moulineaux (FR)

(72) Inventor: Philippe Chanclou, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 400 days.

(21) Appl. No.: 18/262,490

(22) PCT Filed: Jan. 21, 2022

(86) PCT No.: PCT/FR2022/050118
§ 371 (c)(1),
(2) Date: Jul. 21, 2023

(87) PCT Pub. No.: WO2022/157463
PCT Pub. Date: Jul. 28, 2022

(65) Prior Publication Data
US 2024/0077569 A1    Mar. 7, 2024

(30) Foreign Application Priority Data

Jan. 22, 2021    (FR) ...................................... 2100617

(51) Int. Cl.
*G01S 5/02*          (2010.01)
*G01S 1/02*          (2010.01)
(52) U.S. Cl.
CPC .......... *G01S 5/02216* (2020.05); *G01S 1/024* (2013.01)
(58) Field of Classification Search
CPC ........ G01S 5/02216; G01S 1/024; G01S 5/06; G01S 5/10; G01S 2205/008; H04W 88/085

(Continued)

(56) References Cited

U.S. PATENT DOCUMENTS 9,509,402 B2 * 11/2016 Ryan ..................... H04B 10/116
12,117,537 B2 * 10/2024 Ma ......................... G01S 5/0236
(Continued)

FOREIGN PATENT DOCUMENTS

EP         2338313 B1 * 12/2018     ........ H04W 72/0446
EP         3609201 A1 * 2/2020     ............ H04W 4/023
(Continued)

OTHER PUBLICATIONS

Chanclou Philippe et al., "Fronthaul Timing Imbalance Impact on User Equipment Positioning in 4G and 5G", Dec. 6, 2020, pp. 1-4, 2020 European Conference on Optical Communications (ECOC).
(Continued)

*Primary Examiner* — Mahendra R Patel
(74) *Attorney, Agent, or Firm* — Knobbe, Martens, Olson & Bear, LLP

(57)          ABSTRACT

A method for transmitting signals used to estimate the position of a user terminal. The method includes: transmitting a first signal between a network entity and the user terminal by traveling through a radio unit, the first signal being intended to enable a measurement relating to a transmission travel time between the network entity and the user terminal via the radio unit; and transmitting a second signal between the network entity and the radio unit, the second signal being intended to enable a measurement of a transmission travel time between the network entity and the radio unit; wherein at least one value of a transmission condition of the second signal, termed the second value, is dependent on a value of a transmission condition of the first signal, termed the first value.

11 Claims, 5 Drawing Sheets

(58) Field of Classification Search
USPC ....................................................... 455/456.1
See application file for complete search history.

(56) References Cited

U.S. PATENT DOCUMENTS

| | | | | |
|---|---|---|---|---|
| 12,506,552 | B2 * | 12/2025 | Kim ...................... | H04B 17/373 |
| 2012/0157126 | A1 * | 6/2012 | Rekimoto ............. | H04W 24/08 |
| | | | | 455/456.3 |
| 2017/0339660 | A1 * | 11/2017 | Kazmi ................ | H04W 64/003 |
| 2019/0364536 | A1 * | 11/2019 | Sadiq .................. | H04W 64/003 |
| 2020/0077892 | A1 * | 3/2020 | Tran ...................... | A61B 5/6891 |
| 2020/0128496 | A1 * | 4/2020 | Rama Chandran ... | H04W 52/58 |
| 2020/0229125 | A1 * | 7/2020 | Manolakos ........... | H04W 24/10 |
| 2020/0229126 | A1 * | 7/2020 | Soriaga ............... | H04W 64/003 |
| 2023/0071471 | A1 * | 3/2023 | Park ..................... | H04B 7/0617 |
| 2023/0239817 | A1 * | 7/2023 | Lins De Medeiros ...................... | |
| | | | | H04L 5/1469 |
| | | | | 370/503 |

FOREIGN PATENT DOCUMENTS

| | | | | | |
|---|---|---|---|---|---|
| EP | 3269118 | B1 | * | 12/2020 | ............ H04W 72/21 |
| FR | 2865837 | A1 | * | 8/2005 | ............. G08G 1/207 |
| WO | WO-2004021733 | A1 | * | 3/2004 | .......... G01S 5/0226 |
| WO | WO-2015135581 | A1 | * | 9/2015 | ......... H04W 64/003 |
| WO | WO-2019232456 | A1 | * | 12/2019 | .............. G01S 1/20 |
| WO | WO-2020067973 | A1 | * | 4/2020 | ........ H04B 7/18541 |

OTHER PUBLICATIONS

O-Ran Fronthaul Working Group 4, "Control, User and Synchronization Plane Specification", Internet Citation, Aug. 2, 2019, pp. 1-218.

International Search Report for International Application No. PCT/FR2022/050118, dated May 27, 2022.

* cited by examiner

DELAY PROCESSING FOR A GEOLOCATION MEASUREMENT

CROSS-REFERENCE TO RELATED APPLICATIONS

This application is filed under 35 U.S.C. § 371 as the U.S. National Phase of Application No. PCT/FR2022/050118 entitled "DELAY PROCESSING FOR A GEOLOCATION MEASUREMENT" and filed Jan. 21, 2022, and which claims priority to FR 2100617 filed Jan. 22, 2021, each of which is incorporated by reference in its entirety.

BACKGROUND

Field

The present development relates to the field of geolocation of user terminals, for example geolocation by means of a triangularization technique via antennas close to a user terminal.

Description of the Related Art

It has applications in particular in calculating the distance between a transmitter and a user terminal by estimating arrival times or differences in arrival times.

For example, such estimates can be made by measurements of the Reference Signal Time Difference or RSTD or the Uplink Time Difference of Arrival or U-TDOA by the user terminal whose geolocation is to be determined. To measure the RSTD, reference signals, for example positioning reference signals (PRS) can be sent by the Digital Unit or DU of the radio access network or RAN to the user terminal. The reference signal emitted by the DU is thus transmitted to a radio unit or RU of an antenna and then to the user terminal that is to be geolocated. To measure the U-TDOA, reference signals can be sent by the user terminal to the digital unit via an antenna.

Whether in the case of measurement carried out via the sending of reference signals by the DUs to the user terminal as described above, i.e. via downlink, or the case of measurement carried out via the sending of reference signals by the user terminal to the DUs, in order to accurately estimate the geolocation by means of arrival times or differences in arrival times it is necessary to know the travel time of the reference signals between the antenna or antennas and the user terminal.

These transmission travel times for reference signals between the antennas (or RUs located close to the antennas, which is not necessarily the case for DUs) and the user terminal can be deduced from the travel time between the DU and the user terminal, i.e. the time the reference signals take to travel the DUs/user terminal path, since it is considered that the time taken by the reference signals to travel the DUs/RUs path is negligible. Indeed, current geolocation techniques were designed at a time when the functions performed by DU and RU types of devices were grouped together in a single device or at least were co-located close to the antenna.

However, DU and RU types of devices are tending to be increasingly distant from each other, over distances that can vary from a few meters to several tens of kilometers. The travel time between these devices is no longer negligible and falsifies the geolocation measurements.

SUMMARY

The present development improves the situation.

A first aspect of the development relates to a method for transmitting signals used to estimate the position of a user terminal, said method comprising:

the transmission of a first signal between a network entity and the user terminal by traveling through a radio unit, the first signal being intended to enable a measurement relating to a transmission travel time between the network entity and the user terminal via the radio unit; and the transmission of a second signal between the network entity and the radio unit, the second signal being intended to enable a measurement of a transmission travel time between the network entity and the radio unit;

wherein at least one value of a transmission condition of the second signal, termed the second value, is dependent on a value of a transmission condition of the first signal, termed the first value.

It is thus possible to ensure that the transmission conditions between the network entity and the radio unit are the same or similar for the transmission of the first signal and of the second signal. By having similar transmission conditions (i.e. similar values relative to each signal in these conditions), the differences between the transmission travel times of the first and second signal between the network entity and the radio unit are significantly reduced.

Transmission conditions are understood to mean both the conditions internal to the network (prioritization, resource allocation, routing path, buffering, channel coding, etc.) and the conditions external to the network (time frame, temperature variation, significant traffic fluctuation, electromagnetic interference, etc.). These transmission conditions impact the signal transmission time more or less significantly. The value of a condition of a signal is understood to mean the value assigned to this condition by the network for this signal (for example, a priority level, an index of an allocated resource, an address through which the routing path travels, time in buffer, channel coding level, etc.) when it concerns a condition internal to the network, or the value imposed by elements external to the network when it concerns a condition external to the network (transmission time frame, amount of resource available at a point in the network, latency level, temperature of the transmission infrastructure, etc.).

Signals used to estimate the position of a terminal are understood to mean the signals used to determine travel times between two points in the network, for example between a user terminal for which the position is to be determined and a network entity via a radio antenna or even a radio unit whose position is known (for example, the first signal which is intended to enable measuring a transmission travel time between the network entity and the user terminal via the radio unit), or between the network entity and the radio unit (for example, the second signal which is intended to enable measuring a transmission travel time over a portion of a communication network between the network entity and the radio unit). These signals can be reference signals. Thus, when the network entity is the one which sends the signals and the user terminal is the one which receives them, meaning when a downlink is used, then the signals used can be positioning reference signals (PRS). These PRS sequences are particularly advantageous as they have good autocorrelation properties and low cross-correlation, thus making it possible to extract the PRS in a precise manner in order to measure the arrival time. When the network entity is the one that receives the signals and the user terminal is the one that sends them, meaning when an uplink is used, then the signals used can be timestamped upon their reception by several network entities.

Radio unit is understood to mean the radio transceiver which processes or produces the electrical signal transmitted to the antenna or received from the antenna and which corresponds to the radio signal sent or received by the antenna. Radio unit is the term used in the 5G standard, but this unit can also be called remote radio head (RRH) or remote radio unit (RRU). This radio unit is separate from the network entity. User terminal receiving radio signals from the radio unit is understood to mean that the terminal can at least partially decode the signals it receives from the radio unit. The user terminal can be connected to the base station corresponding to the radio unit.

The network entity can be a digital unit (this is the term used in the 5G standard), also called a baseband unit (BBU). It can be included in a base station or be co-located with a centralized unit (CU). The network entity is connected to the radio unit by optical and/or microwave links, over distances varying from a few meters to several tens of kilometers. The network entity allows processing the digital data sent to and from the radio unit which receives and sends this data in radioelectric form.

The transmission condition of the first signal can correspond to a transmission condition between the network entity and the radio unit.

Value of a transmission condition of a signal that is dependent on the value of the transmission condition of another signal, is understood to mean that these values can be made dependent by the network entity or by any other entity of the network that is involved in the transmission of these signals. Thus, if the value of a transmission condition of the signal is modified, then the value of this same transmission condition of the other signal is also modified accordingly. The dependency of the two values can correspond to the fact that the two values are equal or that a distance between these two values is less than a threshold.

Measurement of the transmission travel time of a signal between the network entity and the radio unit can be carried out by any known technique, in one direction or the other. When the network entity and the radio unit are synchronized (which is provided for by the 5G standard) then a measurement of the transmission travel time can be carried out by sending a signal comprising information relating to the time of its transmission, and the receiver can then compare the time of arrival with the time of transmission of the signal. Measurement of the transmission travel time between the network entity and the radio unit can then be done by the network entity when the radio unit sends the second signal, or by the radio unit when the network entity sends the second signal. In the latter case, the radio unit can transmit this measurement to the network entity if necessary (whenever the network entity uses this measurement and it has not calculated it itself, it obtains it via the radio unit).

Thus, the transmission of a signal between two entities includes the sending of this signal by one of the entities and the reception by the other, or vice versa.

According to one embodiment, termed downlink mode, the transmission of the first signal is a sending of the first signal by the network entity towards the user terminal, and the transmission of the second signal is a sending of the second signal by the network entity towards the radio unit.

According to another embodiment, termed uplink mode, the transmission of the first signal is a reception by the network entity of the first signal originating from the user terminal, and the transmission of the second signal is a reception by the network entity of the second signal originating from the radio unit.

In this case, the sending of the second signal by the radio unit can be triggered by the reception by the radio unit of a third signal sent by the network entity.

According to one embodiment:

the network entity is a digital unit DU; and/or the first signal is a positioning reference signal PRS; and/or the second signal is a transmission delay measurement signal with a start time set by the network entity and an arrival time measured by the radio unit (for downlink mode, and vice versa for uplink mode).

According to one embodiment, a delay between the sending of the first signal and the sending of the second signal is less than a threshold.

According to one embodiment, a delay between the reception of the first signal and the reception of the second signal is less than a threshold.

In these two cases, it is then possible to ensure that the transmission of the first signal and of the second signal between the network entity and the radio unit are carried out simultaneously or at least within a certain temporal proximity. It can thus be ensured that the transmission conditions which vary over time remain the same or similar during the transmission of the first and second signal between the network entity and the radio unit. Thus, the values relating to the first and second signal for at least some of the transmission conditions between the network entity and the radio unit are made dependent. This is particularly advantageous when the variation in transmission condition has a lower frequency than the number of allocation units that it is possible to implement per second, or in other words lower than the number of reference signals that it is possible to send per second. For example, in 5G where the minimum allocation unit is the resource block (RB), this implementation is particularly advantageous when the frequency of the variation in the condition is lower than the number of RBs per second.

According to one embodiment, the second signal is a signal among a set of signals sent by the network entity to the radio unit and which are intended to enable a measurement of the transmission travel time between the network entity and the radio unit, and the second signal is selected as having the second value that is the most dependent on the first value.

It is thus possible to select, in particular after the transmission of the first signal, the most appropriate measurement of the transmission travel time between the network entity and the radio unit, in order to obtain relevant information about the transmission travel time between the radio unit and the user terminal.

For example, the most appropriate measurement can be the one derived from the second signal when the delay between the times the first and second signal are sent by the network entity is less than the threshold. The signals sent by the network entity can be sent periodically in order to ensure a relevant set of travel time measurements.

It is also possible to associate, with each transmission travel time of the signals in the set of signals, a value for the transmission condition of the signal between the network entity and the radio unit. The most appropriate measurement of the transmission travel time between the network entity and the radio unit can thus be the one having the same value as or a value close to (for example where the difference is less than a threshold) the value for the transmission condition between the network entity and the radio unit of the first signal. Similarly, in uplink mode, the second signal is a signal among a set of signals sent by the radio unit to the network entity and intended to enable a measurement of the transmission travel time between the radio unit and the network entity, and the second signal is selected as having the second value that is the most dependent on the first value.

According to one embodiment, the network entity periodically sends signals to the radio unit, each of these signals being intended to enable the measurement of a transmission travel time over the portion of the communication network between the network entity and the radio unit, the network entity sending the first signal and the second signal when the measurements of the transmission travel time of the periodically-sent signals are stable. The first and second values are then representative of this stability.

Thus, when the measurements of the transmission travel time of the periodically-sent signals are stable, the transmission conditions between the network entity and the radio unit can also be considered stable. Sending the first and second signal when the transmission conditions are stable avoids any change in the transmission conditions between the time the first signal is sent and the time the second signal is sent. Similarly, in uplink mode, the radio unit periodically sends signals to the network entity, each of these signals being intended to enable the measurement of a transmission travel time over the portion of the communication network between the radio unit and the network entity, the network entity receiving the first signal and second signal when the measurements of the transmission travel time of the periodically-sent signals are stable.

According to one embodiment, the network entity sends the first signal and the first signal comprises the measurement of the transmission travel time of the second signal over the portion of a communication network between the network entity and the radio unit.

Thus, when the network entity measures the travel time of the second signal or the radio unit provides the network entity with this measurement, the network entity can transmit this measurement with the first signal so that the terminal which receives the first signal can determine the measurement of the travel time for the first signal between it and the radio unit or can send all this information to the server that performs the geolocation service.

According to one embodiment, the following is further understood:

the transmission of another first signal between the network entity or another network entity and the user terminal by traveling through another radio unit, the other first signal being intended to enable a measurement relating to a transmission travel time between the network entity or the other network entity and the user terminal via the other radio unit;

and the transmission of another second signal between the network entity or the other network entity and the radio unit, the second signal being intended to enable a measurement of a transmission travel time between the network entity or the other network entity and the radio unit; wherein at least one other value of the transmission condition of the other first signal is dependent on a value of the transmission condition of the other second signal.

Thus, the method implemented with the network entity, the radio unit, and the user terminal is also carried out with another antenna (i.e. with the network entity, another radio unit, and the user terminal when this other antenna is part of the same base station including the radio unit, or with another network entity, another radio unit, and the user terminal when this other antenna is part of a base station other than the one that houses the radio unit). This makes it possible to obtain transmission travel time measurements between the other radio unit and the user terminal and therefore more precise measurements of the transmission travel time difference between the radio unit and the user terminal on the one hand and the other radio unit and the user terminal on the other hand. These difference measurements are used for subsequent geolocation operations for the terminal.

According to one embodiment, further included is the sending, by the network entity to a geolocation server, of a message comprising information relating to a time difference between times of reception of the first signal and of the other first signal by the user terminal.

Thus, the network entity transmits, to the data processing server performing the service of determining the position of the user terminal (geolocation), at least part of the measurements necessary for determining the position of the user terminal. These measurements can be a transmission travel time between the network entity and the terminal, or the transmission travel time between the radio unit and the user terminal (the network entity then determines this time by comparing the transmission travel time between the network entity and the user terminal and the transmission travel time between the network entity and the radio unit); it is an absolute measurement of the travel time. These measurements can also be a time difference between times of reception by the user terminal of the first signal and of another signal; this is called RSTD (Reference Signal Time Difference). Or, in uplink mode, these measurements can also be a time difference between times of reception by the network entity of the first signal and by the other network entity (or the network entity) of the other second signal; this is called U-TDOA. When this information is determined by the user terminal, the user terminal can send it to the network entity before the network entity transmits it to the server which performs the geolocation service.

According to one embodiment, further included is the sending, by the network entity and towards a geolocation server, of a message comprising information relating to a transmission travel time of the second signal between the network entity and the radio unit.

The geolocation server can thus adapt the information relating to a time difference between times of reception by the user terminal of the first signal and of the other first signal. In other words, the geolocation server can correct the RSTD by compensating for error induced by not taking into account in the RSTD the transmission times of the reference signals between the network entity(ies) and the radio units. In one variant, the network entity transmits in the same message the two pieces of information which allow calculating the position of the user terminal, thus reducing the network resources required for implementing the development.

According to one embodiment, the portion of the communication network between the network entity and the radio unit comprises a transport network device, and the transport network device participates in the transmission of the first signal and second signal by applying, for each of these transmissions, a same value of a transmission parameter and/or a same routing and/or dedicated resources.

Thus, the first signal and the second signal are processed and sent via the transmission network device in a similar manner. Indeed, any processing and/or sending carried out in a differentiated manner can introduce different processing and/or sending times between the first and second signal. This thus ensures that the transmission travel times remain similar between the first and second signal, for the portion between the network entity and the radio unit.

The manner in which the processing and sending are carried out by the transport network device constitutes transmission conditions within the meaning of the development.

For example, the two signals are transmitted via the same routing path, which avoids differences in the transmission travel time for the first and second signal between the network entity and the radio unit due to transmissions over two routing paths of different lengths.

The portion of the communication network between the network entity and the radio unit is a portion of the communication network used for the transmission of signals between the network entity and the radio unit. The transmission of the first and second signal can be done via this portion of the communication network. The portion of the network may include all elements of the network which enable the transmission of signals between the network entity and the radio unit.

Application of a value of a transmission parameter to the transmission of a signal is understood to mean that the processing (for example the timing or prioritization) of the signal received by the transport network device, and/or its sending, are carried out using the value of the transmission parameter (for example, by applying a delay time corresponding to the value, or by applying a prioritization or priority level of the signal corresponding to the value).

Transport network device is understood to mean any network device through which signals travel during transmission between the network entity and the radio unit. It may be, for example, a router, a multiplexer/demultiplexer, or a converter (for example an optical-to-electrical converter).

According to one embodiment, further included is the sending of a message by the network entity towards the transport network device, the message comprising an item of information among a transmission parameter value to be applied, a time period during which the value of the transmission parameter is to be applied to signals originating from or intended for the network entity, information which allows identifying the first and second signal, and resources used for the transmission of the first and second signal.

Thus, the network entity transmits information or a command to the transport network device, to enable the latter to apply, for the transmission of the first signal and of the second signal, the same value for the transmission parameter and/or the same routing and/or dedicated resources. For this purpose, the transport network device can receive a command with the value of the transmission parameter to be applied (for example the level of priority at which the first and second signals are to be processed). The transport network device can also receive the period during which this value is to be applied, or alternatively the signals concerned by a transmission carried out by means of the transmission parameters.

According to another aspect, a computer program is provided comprising instructions for implementing all or part of a method as defined herein when these instructions are executed by a processor. According to another aspect of the development, a non-transitory, computer-readable storage medium is provided on which such a program is stored.

According to another aspect, a network entity of a communication network is proposed, comprising:

a network interface;
a processor; and a memory storing instructions, so that when these instructions are executed by the processor, they configure the network entity for:
transmitting a first signal between a network entity and the user terminal by traveling through a radio unit, the first signal being intended to enable a measurement relating to a transmission travel time between the network entity and the user terminal via the radio unit; and
transmitting a second signal between the network entity and the radio unit, the second signal being intended to enable a measurement of a transmission travel time between the network entity and the radio unit;
wherein at least one value of a transmission condition of the second signal, termed the second value, is dependent on a value of a transmission condition of the first signal, termed the first value.

According to another aspect, a transport network device is proposed comprising:
a network interface;
a processor; and
a memory storing instructions, so that when these instructions are executed by the processor, they configure the transport network device for:
receiving via the network interface a first signal originating from a user terminal and traveling through a radio unit or originating from a network entity, the first signal being intended to enable a measurement of a transmission travel time between the network entity and the user terminal via the radio unit;
receiving via the network interface a second signal originating from the network entity or from the radio unit, the second signal being intended to enable a measurement of a transmission travel time over a portion of a communication network comprising the transport network device between the network entity and the radio unit;
sending the first signal towards the user terminal via the network interface by traveling through a radio unit if the first signal originates from the network entity, or towards the network entity if the first signal originates from the user terminal;
sending the second signal towards the radio unit via the network interface if the second signal originates from the network entity, or towards the network entity if the second signal originates from the radio unit;
wherein the sending of the first and second signal is carried out according to a same transmission parameter and/or by using a same routing and/or dedicated resources.

BRIEF DESCRIPTION OF THE DRAWINGS

Other features, details, and advantages of the development will become apparent upon reading the detailed description below, and upon analyzing the appended drawings, in which.

DETAILED DESCRIPTION OF CERTAIN ILLUSTRATIVE EMBODIMENTS

Figure 1:
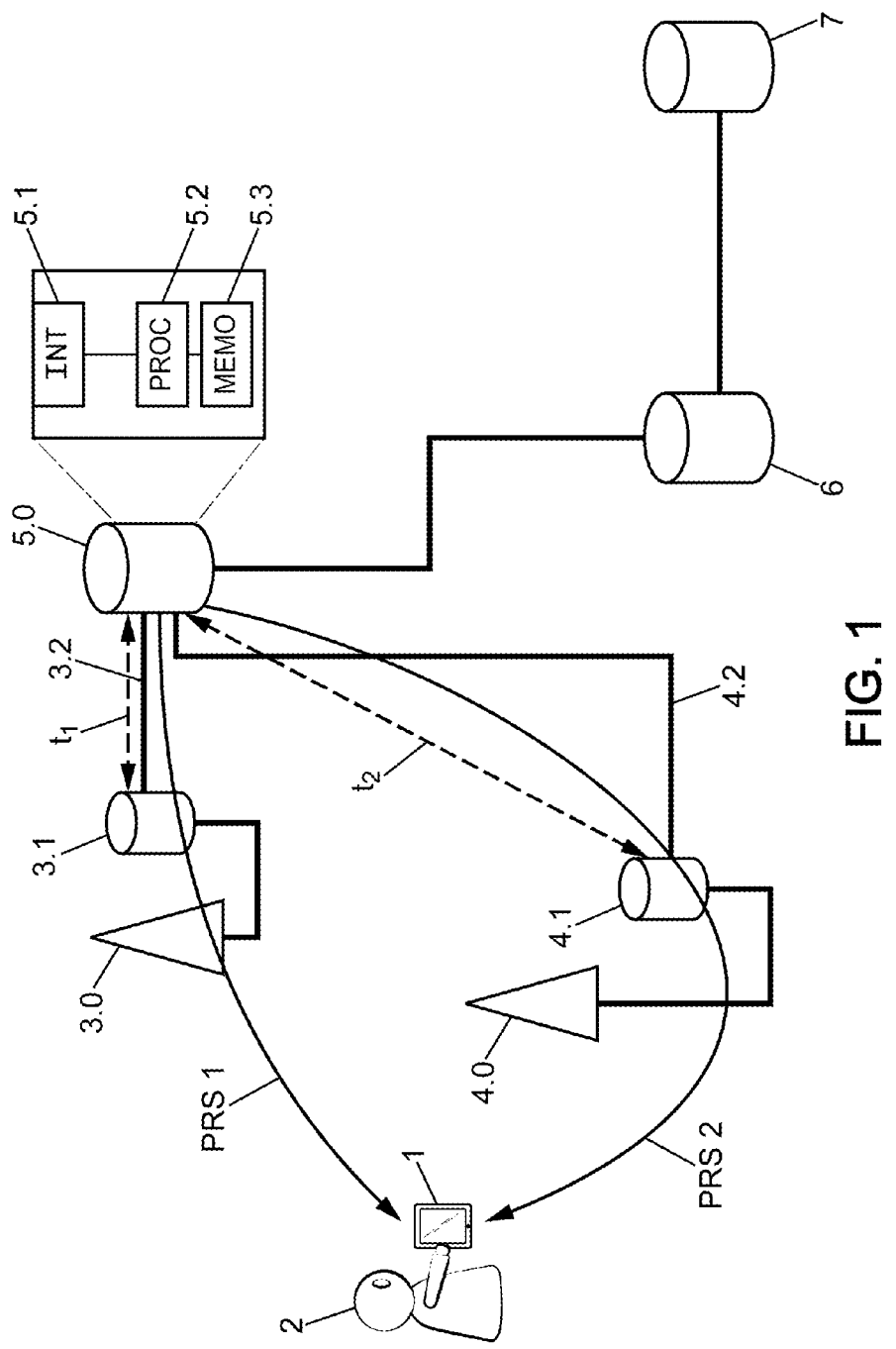
FIG. 1 illustrates a network entity, a radio unit, and a user terminal according to one embodiment of the development.

In the example of FIG. 1, the user terminal 1 of a user 2 lies within the radio coverage of two radio antennas 3.0 and 4.0.

User terminal 1 receives the signals produced by radio units (RU) 3.1 and 4.1 and transmitted respectively by antennas 3.0 and 4.0. Radio units 3.1 and 4.1 are each connected to a network entity 5.0. Links 3.2 and 4.2 between the network entity and radio units 3.1 and 4.1 can be optical or even electrical links. Network entity 5.0 is a distributed unit (DU) in the 5G standard. This network entity 5.0 sends signals to radio units 3.1 and 4.1, which radio units 3.1 and 4.1 convert into electrical signals, inducing radio signals via antennas 3.0 and 4.0. Radio unit 3.1 and network entity 5.0 may be co-located, the link between the radio unit and network entity 5.0 then being short, for example several meters. Network entity 5.0 may also be located at a distance from radio unit 4.1, for example several kilometers or tens of kilometers.

In the example of FIG. 1, a single network entity 5.0 is represented for the two radio units 3.1 and 4.1. Each radio unit 3.1 and 4.1 can be served by a separate network entity, which is not shown in the figure, but in such case the implementation of the development does not imply any particular modification in comparison to the implementation described in FIG. 1.

In the example of FIG. 1, a centralized unit (CU) 6 is also connected to network entity 5.0. In the 5G standard, the separation of functions of a base station means that it can consist of a centralized unit CU connected to one or more network entities DU, each DU being connected to one or more radio units RU.

Geolocation of user terminal 1 is achieved, among other things, by a measurement relating to the signal transmission travel time, for example of reference signals such as PRS, between network entity 5.0 and user terminal 1.

In downlink mode, network entity 5.0 sends one PRS to user terminal 1 via radio unit 3.1 and another PRS to user terminal 1 via radio unit 4.1. The user terminal then measures the time difference A between the times of reception of these two PRS signals. However, the RSTD (Reference Signal Time Difference) obtained does not take into account the transmission travel time of signals PRS1 and PRS2 over links 3.2 and 4.2, these not having the same transmission characteristics. The measurements relating to transmission travel times T1 and T2 of signals PRS1 and PRS2 over links 3.2 and 4.2 include transmission travel times t1 and t2 between network entity 5.0 and each of radio units 3.1 and 4.1 respectively. Measurement of times t1 and t2 can be done using dedicated signals S1 and S2 in the control plane between network entity 5.0 and respectively each of radio units 3.1 and 4.1.

The geolocation of user terminal 1 can be obtained by direct measurement of the difference in transmission travel times $T_1$ and $T_2$ of PRS1 and PRS2 respectively, meaning the RSTD, from which is subtracted the difference between $t_1$ and $t_2$.

In uplink mode, terminal 1 sends (for example, upon receiving a message from the network entity) reference signals RS1 and RS2 to network entity 5.0, via radio unit 3.1 and 4.1 respectively. Similarly, radio units 3.1 and 4.1 send (for example, upon receiving a message from the network entity) signals S'1 and S'2 to network entity 5.0 in order to calculate $t_1$ and $t_2$ respectively. Network entity 5.0 can then send to geolocation server 7 the transmission time of RS1, RS2, S'1, and S'2, or can directly correct RS1 with S'1 and RS2 with S'2 so as to send only the corrected value of RS1 and RS2 respectively corresponding to the transmission time between the terminal and each of radio units 3.1 and 4.1. Geolocation server 7 then calculates U-TDOA.

The measurements of times $t_1$ and $t_2$ and the transmission of PRS1 and PRS2, respectively RS1 and RS2, in order to determine the RSTD, respectively the U-TDOA, are triggered by a request to geolocation server 7 (Geoloc) requesting the positioning of user terminal 1. This may be requested by an application on user terminal 1 or by a request external to the terminal, for example in order to geolocate user 2 of terminal 1. Server 7 triggers, at the centralized unit 6 which controls network entity 5.0, the measurements of times $t_1$ and $t_2$ and the transmission of PRS1 and PRS2.

Figure 2:
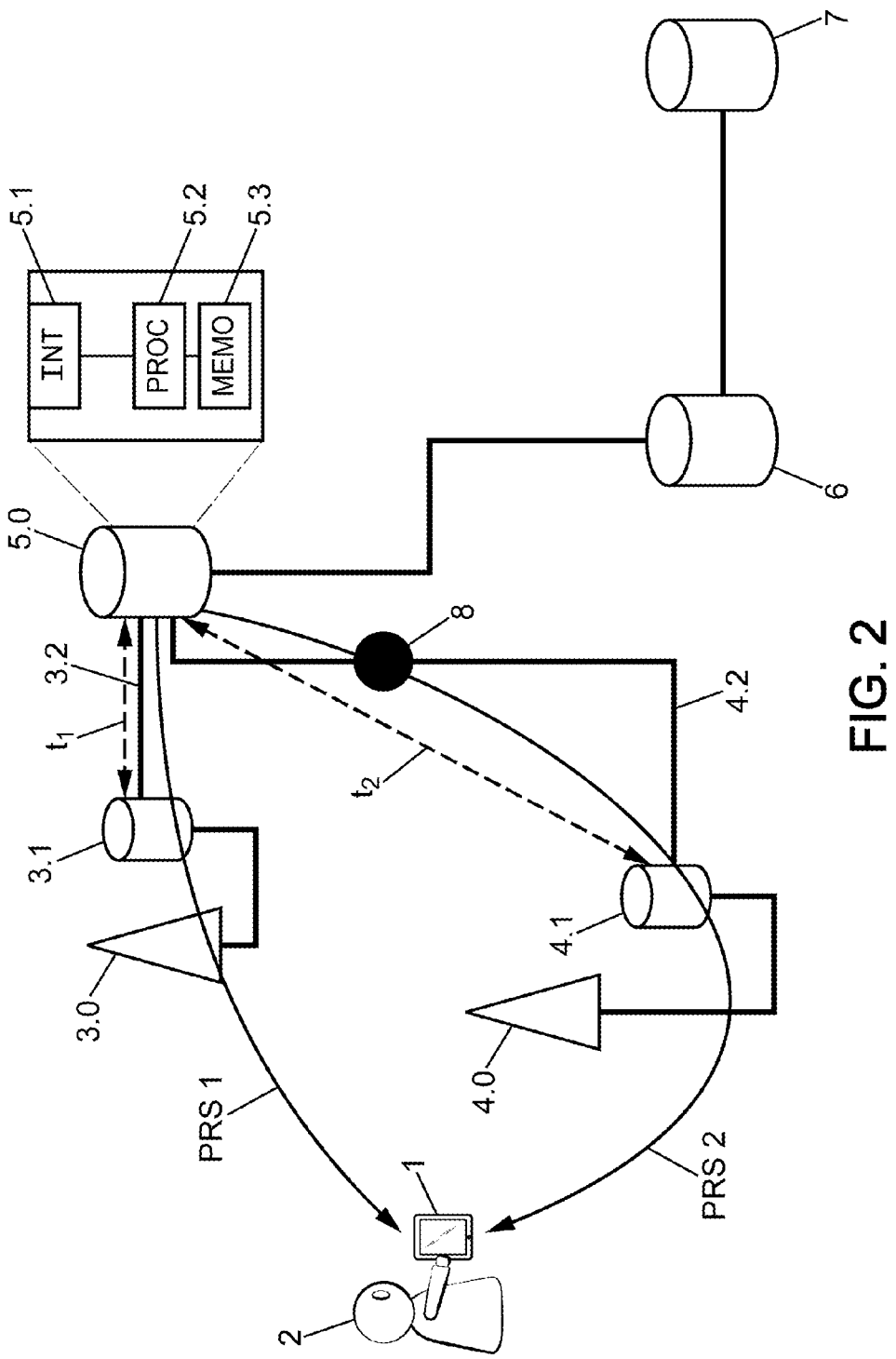
FIG. 2 illustrates a network entity, a transport network device, a radio unit, and a user terminal according to one embodiment of the development.

FIG. 2 describes, in addition to the elements of FIG. 1, a transport network device 8, this network device enabling the transport of signals transmitted over link 4.2. Transport network device 8 may be for example a router, an optical Ethernet switch, an optical-to-electrical converter, or any other device which processes and/or transports the signals transmitted over link 4.2. These transport network devices can introduce latency in the processing and sending of signals, for example by storing the signal in a buffer memory before processing or sending it, for example in the event of network overload and according to the priority assigned to each signal. Thus, these transport network devices process and send signals by applying a transmission parameter value (for example the priority level of a signal, or modulation and encoding/decoding schemes) which directly impacts the processing time by the device and therefore influences the transmission travel time of PRS2 (respectively RS2) and of signal S2 (respectively S'2) transmitted between radio unit 4.1 and network entity 5.0. In some cases, for example the case of routers, these devices can cause different routing paths to be taken and therefore again can influence the transmission travel time over link 4.2.

Network entity 5.0 of FIG. 1 and FIG. 2 comprises an interface module (INT) 5.1 for interfacing with the communication network, i.e. an interface making it possible to receive and send signals with radio units 3.1 and 4.1 and by extension with user terminal 1, and making it possible to receive commands from centralized unit 6 and to send to server 7, possibly via centralized unit 6, the measurements for RSTD, $t_1$ and $t_2$.

Network entity 5.0 also comprises a processor (PROC) 5.2 and a memory (MEMO) 5.3.

Memory 5.3 comprises a non-volatile memory in which the computer program is stored and a volatile memory in which the parameters for implementing the development are stored, for example the transmission parameter values to be applied, measurements of the transmission travel time between the network entity and the radio units ($t_1$ and $t_2$) associated with transmission condition values (for example, transmission parameters and/or routing paths and/or specific resources), a threshold 6, a period for sending signals S1 and S2 or S'1 and S'2.

Processor 5.2 is configured in particular to control interface module (INT) 5.1 in order to be able to send or receive PRS1, PRS2, RS1, RS2, S1, S2, S'1 and S'2 and to transmit the RSTD, $t_1$ and $t_2$ measurements and/or the travel time of RS1 and RS2 to geolocation server 7.

Figure 3:
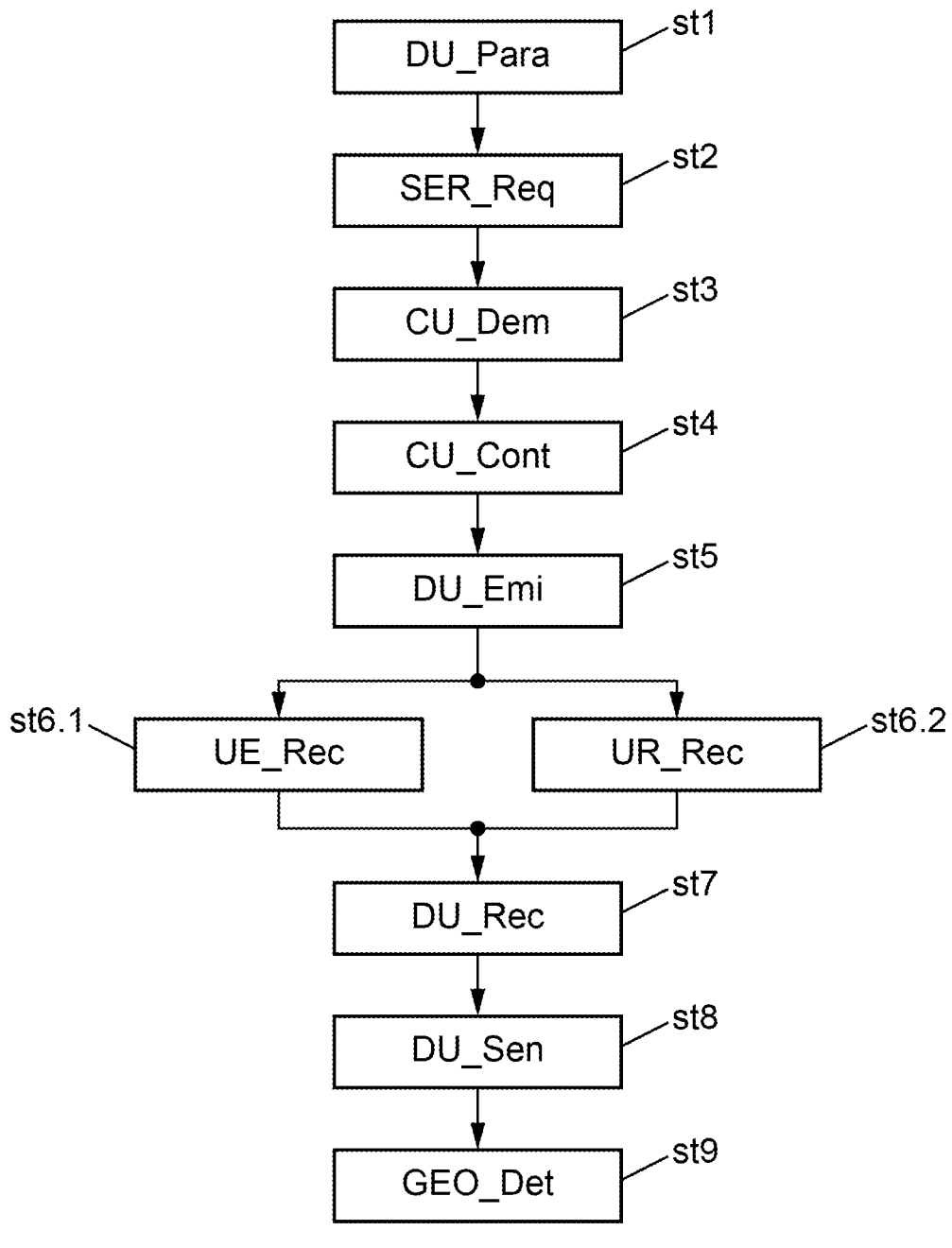
FIG. 3 illustrates a flowchart representing the method according to the development.

FIG. 3 shows a flowchart of a method according to one embodiment of the development.

In step St1, the network entity is configured with parameters, i.e. threshold 6 is stored in memory 5.3 of network entity 5.0.

In step St2, server 7 receives a geolocation request from user terminal 1, for example, a request sent by a monitoring entity further upstream in the network, or by an application on user terminal 1.

In step St3, server 7 sends an RSTD or U-TDOA measurement request to centralized unit 6. The measurements of times $t_1$ and $t_2$ will also be requested or in any case sent to server 7.

In step St4, centralized unit 6 sends a message through a control channel to network entity 5.0 in order to trigger the measurement protocol relating to the travel time.

In step St5, in downlink mode, network entity 5.0 which has received the message emits signals PRS1 and PRS2, PRS1 being sent to user terminal 1 via radio unit 3.1 and PRS2 being sent to user terminal 1 via radio unit 4.1.

In addition, network entity 5.0 emits, in the control plane, signals S1 and S2 respectively to radio units 3.1 and 4.1.

The time difference between the sending of signal PRS1 (respectively PRS2) and the sending of signal S1 (respectively S2) is less than a threshold 6, for example less than 1 ms.

In uplink mode, alternatively to the sending of signals PRS1 and PRS2, network entity 5.0 can send to user terminal 1 a message in the control plane to trigger the sending of reference signals RS1 and RS2 by user terminal 1 to network entity 5.0 via radio units 3.1 and 4.1 respectively.

A time slot defined by network entity 5.0 is configured so that the time difference between the sending of signal RS1 (respectively of signal RS2) by user terminal 1 and the reception of signal S'1 (respectively S'2) by network entity 5.0 is lower than threshold 6. For example, network entity 5.0 can receive signals S1 and S2 within the time slot and the duration of the timeslot is less than threshold 6.

Preferably, network entity 5.0 can send messages to radio units 3.1 and 4.1 in the control plane in order to trigger the sending by radio units 3.1 and 4.1 of respective signals S'1 and S'2 to network entity 5.0 within the time slot.

In uplink mode, network entity 5.0 does not send signals PRS1 and PRS2 to user terminal 1 nor signals S1 and S2 to respective radio units 3.1 and 4.1. The messages sent to radio units 3.1 and 4.1 and to user terminal 1 can specify that the sending of signals S'1 and S'2 and of signals RS1 and RS2 must be done within a time slot defined by network entity 5.0. The time slot defined by network entity 5.0 is configured so that the time differences between the sending of signal RS1 and of signal RS2 by user terminal 1, and respectively the sending of signal S'1 and of S'2 by radio units 3.1 and 4.1, are below threshold 6.

Signals PRS1, PRS2, RS1, RS2, S1, S2, S'1 and S'2 may be sent periodically. When they are not sent by the network entity then it is necessary to send messages controlling a periodic sending of the various signals. When the periodicity is less than 2.6 then it is possible to carry out the measurements by selecting the periodic signals sent within the time slot previously described.

In step St6.1, user terminal 1 receives signals PRS1 and PRS2 sent by network entity 5.0 (downlink mode), or alternatively network entity 5.0 receives signals RS1 and RS2 (uplink mode).

Similarly, in step St6.2, network entity 5.0 receives signals S'1 and S'2 respectively sent by radio units 3.1 and 4.1

(uplink mode), or alternatively radio units 3.1 and 4.1 receive signals S1 and S2 sent by network entity 5.0 (downlink mode).

In step St7, network entity 5.0 receives the RSTD measurement of the time difference between the time of receipt of PRS1 and PRS2 by user terminal 1 (downlink mode), or network entity 5.0 measures the time difference between the time of receipt of RS1 and RS2 (upstream mode). In addition, network entity 5.0 receives the measurements of times $t_1$ and $t_2$ carried out respectively by radio units 3.1 and 4.1 (downstream mode), or network entity 5.0 measures times $t_1$ and $t_2$ when radio units 3.1 and 4.1 respectively send S'1 and S'2 (uplink mode).

In step St8, network entity 5.0 sends the RSTD to server 7 or sends the transmission times of RS1 and RS2 to geolocation server 7.

In step St9, network entity 5.0 sends $t_1$ and $t_2$ to server 7, possibly at the request of server 7. Server 7 can thus determine the position of user terminal 1 on the basis of the corrected RSTD and possibly on other corrected RSTD measurements obtained separately or on the basis of the RS1 and RS2 transmission times.

Figure 4:
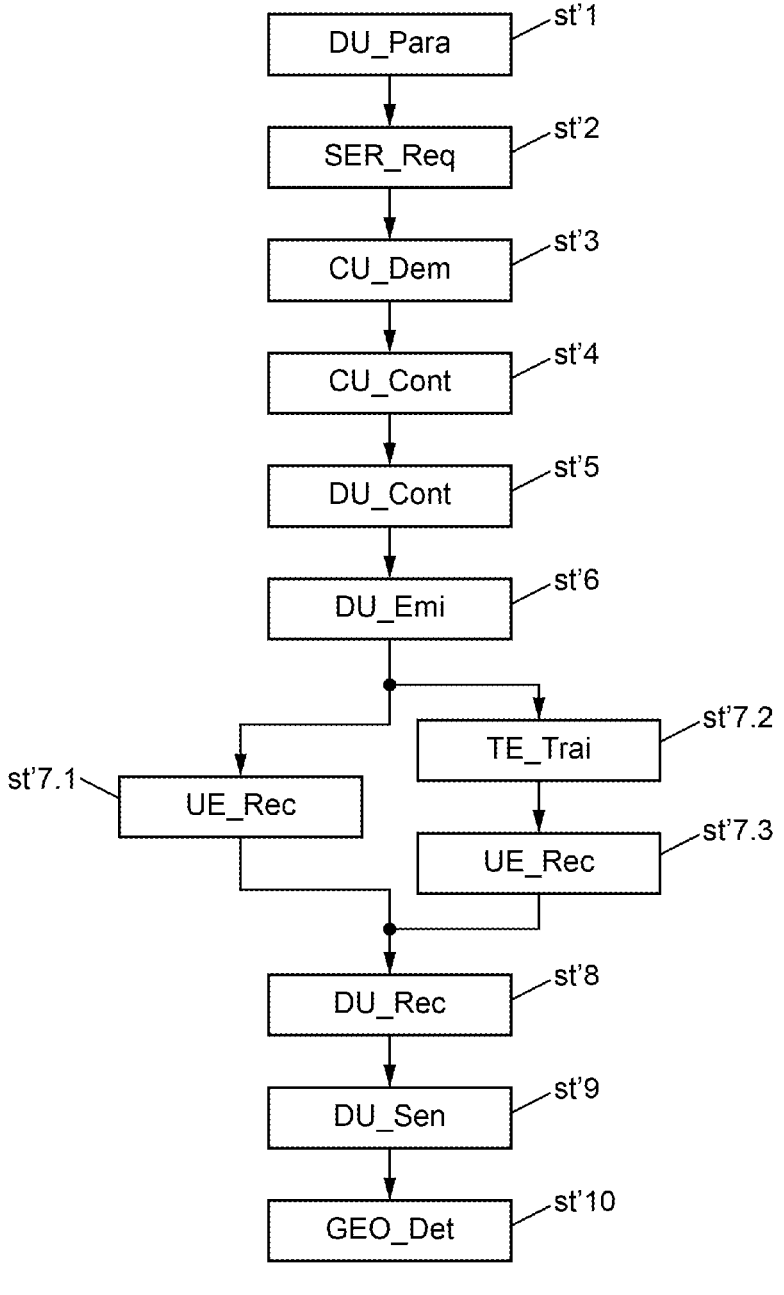
FIG. 4 illustrates a flowchart representing the method according to the development.

FIG. 4 shows a flowchart of a method according to one embodiment of the development. This embodiment involves the participation of at least one transport network device located between network entity 5.0 and a radio unit.

In step St' 1, the network entity is configured with parameters, for example the transmission parameter values (signal priority), the routing paths, and/or the specific resources to be applied are stored in memory 5.3 of network entity 5.0.

In step St'2, server 7 receives a geolocation request 7 requesting the positioning of user terminal 1, for example a request sent by a monitoring entity further upstream in the network, or sent by an application on user terminal 1.

In step St'3, server 7 sends an RSTD or U-TDOA measurement request to centralized unit 6. The measurements of times $t_1$ and $t_2$ will also be requested or in any case sent to server 7.

In step St'4, centralized unit 6 sends a message through a control channel to network entity 5.0 in order to trigger the measurement protocol relating to the travel time.

In step St'5, network entity 5.0 which has received the message sends a control message to transport network device 8 in order to configure it. Thus, the message can indicate to transport network device 8 the level of priority to be applied to signals PRS2 or RS2, and S2 or S'2. In addition, the message can indicate the routing path to be applied or specific resources to be used for signal transport.

In step St'6, in downlink mode, network entity 5.0 emits signals PRS1 and PRS2, PRS1 being sent to user terminal 1 via radio unit 3.1 and PRS2 being sent to user terminal 1 via radio unit 4.1.

In uplink mode, network entity 5.0 sends a message in the control plane to user terminal 1 in order to trigger the sending by user terminal 1 of reference signals RS1 and RS2 to network entity 5.0 via radio unit 3.1 and 4.1 respectively.

As in the embodiments described in FIG. 3, network entity 5.0 can emit signals S1 and S2 respectively towards radio units 3.1 and 4.1 in the control plane (downstream mode), or radio units 3.1 and 4.1 can send signals S'1 and S'2 to the network entity (upstream mode).

However, in the embodiment described in FIG. 4, the calculation of $t_1$ and $t_2$ can be done before server 7 receives a geolocation request 7, for example at the moment when configuring network entity 5.0. It is thus possible to construct a list of transmission travel times $t_{1,0}$; $t_{1,1}$; $t_{1,2}$ . . .

$t_{1,i}$ ... and $t_{2,0}$; $t_{2,1}$; $t_{2,2}$ ... $t_{2,i}$ ... respectively between radio unit 3.1 and radio unit 4.1, and network entity 5.0, each of the times being associated with the values of the corresponding transmission conditions. $t_{1,0}$; $t_{2,0}$ can thus correspond to the travel time when the network load on links 3.2 and 4.2 is low, $t_{1,1}$; $t_{2,1}$ can correspond to the travel time when the network load on links 3.2 and 4.2 is average, etc. $t_{1,i}$ and $t_{2,i}$ can also be associated with the priority levels applied to signals S1, S2 or S'1, S'2 for their calculation. $t_{1,i}$ and $t_{2,i}$ can also be associated with different routing paths used to transport signals S1, S2 or S'1, S'2. It is possible to combine several transmission conditions, and thus to associate $t_{1,i}$ and $t_{2,i}$ of the list with several values, for example a priority level and a value corresponding to a routing path.

In the following we will describe an implementation in which a list of $t_{1,i}$ and $t_{2,i}$ is used.

In step St'7.1, user terminal 1 receives signal PRS1 sent by network entity 5.0, or alternatively network entity 5.0 receives signal RS1.

In step St'7.2, transport network device 8 receives, processes, and retransmits signal PRS2 or RS2 in accordance with the control message received from network entity 5.0 during step St'5.

For example, if the control message indicated a priority level at which transport network device 8 is to process signal PRS2 or RS2 and/or a routing path, then transport network device 8 applies this priority level and routes signals PRS2 or RS2 accordingly.

When a list of $t_{1,i}$ and $t_{2,i}$ is not used but $t_1$ and $t_2$ are determined as in the embodiment of FIG. 3, then transport network device 8 receives, processes, and retransmits signal S2 or S'2 in accordance with the control message received from network entity 5.0, meaning in the same manner as transport network device 8 receives, processes, and retransmits signal RS2 or PRS2.

In step St'7.3, user terminal 1 receives signal PRS2 sent by network entity 5.0 (downlink mode), or alternatively network entity 5.0 receives signal RS2 sent by user terminal 1 (uplink mode).

In step St'8, network entity 5.0 receives the RSTD measurement of the time difference between the time of reception of PRS1 and PRS2 as measured by user terminal 1 (downlink mode), or network entity 5.0 calculates the transmission times of RS1 and RS2 (uplink mode).

Depending on the transmission conditions of signal PRS1 (or RS1), network entity 5.0 selects time $t_{1,p}$, i.e. network entity 5.0 selects the time among the $(t_{1,p})_p$ having been obtained by measuring the transmission travel time of signal S1 or (S'1) having the same transmission conditions as those of signal PRS1 or RS1.

Similarly, depending on the transmission conditions of signal PRS2 (or RS2) and in particular the transmission and/or routing parameters and/or the dedicated resources applied by transport network device 8 in order to transmit PRS2 (or RS2), network entity 5.0 selects time $t_{2,q}$, i.e. network entity 5.0 selects the time among the $(t_{1,q})_q$ which was obtained by measuring the transmission travel time of signal S2 (or S'2) having the same transmission conditions as those of signal PRS2 (or RS2) and in particular having the same transmission and/or routing parameters and/or using the same dedicated resources applied by transport network device 8 in order to transmit PRS2 (or RS2).

In step St'9, network entity 5.0 sends the RSTD to server 7 or the transmission times of RS1 and RS2.

In step St' 10, network entity 5.0 sends $t_1$ and $t_2$ to server 7, possibly at the request of server 7. Server 7 can thus determine the position of user terminal 1 on the basis of the corrected RSTD and possibly on other corrected RSTD measurements obtained separately or on the basis of the transmission times of RS1 and RS2.

The embodiments of FIG. 3 and FIG. 4 can be combined when step St'6 of the embodiment of FIG. 4 is applied in the same manner as step St5 of the embodiment of FIG. 3. In such case, this amounts to adding step St'5 after step St4 in the embodiment of FIG. 3, and transport network device 8 implements step St'7.2. Similarly, the embodiment of FIG. 4 can also involve the participation of a transport network device located between network entity 5.0 and radio unit 3.1, in addition to device 8 located between network entity 5.0 and radio unit 4.1.

In a variant of the downlink mode, when the time difference between the sending of the signals relating to the measurement of the transmission travel times between user terminal 1 and network entity 5.0 allows it, network entity 5.0 can obtain times $t_1$ and $t_2$ before emitting PRS1 and PRS2. In this case, network entity 5.0 can obtain $t_1$ and $t_2$ in order to then insert these times into signal PRS1 and PRS2 intended for user terminal 1. User terminal 1 can then not only determine the RSTD but can correct it by using times $t_1$ and $t_2$, before transmitting the corrected RSTD to network entity 5.0 or even directly to server 7.

Figure 5:
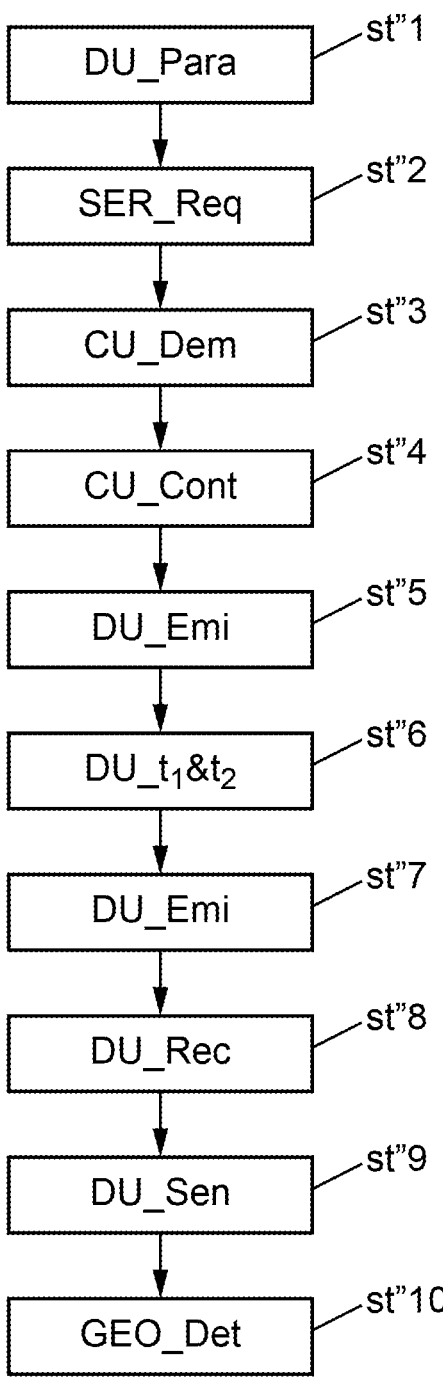
FIG. 5 illustrates a flowchart of a method according to one embodiment of the development.

FIG. 5 shows a flowchart of a method according to one embodiment of the development.

In step St"1, the network entity is configured with parameters.

In step St"2, server 7 receives a geolocation request 7 requesting the positioning of user terminal 1, for example a request sent by a monitoring entity further upstream in the network, or by an application on user terminal 1.

In step St"3, server 7 sends an RSTD or U-TDOA measurement request to centralized unit 6. The measurements of times $t_1$ and $t_2$ will also be requested or in any case sent to server 7.

In step St"4, centralized unit 6 sends a message through a control channel to network entity 5.0 in order to trigger the measurement protocol relating to the travel time.

In step St"5, in downlink mode, network entity 5.0 periodically emits signals S1 and S2, in the control plane, to radio units 3.1 and 4.1 respectively.

In uplink mode, network entity 5.0 can send messages to radio units 3.1 and 4.1 in the control plane to trigger the periodic sending by radio units 3.1 and 4.1 of respective signals S'1 and S'2 to network entity 5.0.

In step St"6, network entity 5.0 receives the measurements of times $t_1$ and $t_2$ made respectively by radio units 3.1 and 4.1 (downlink mode), or network entity 5.0 measures times $t_1$ and $t_2$ when radio units 3.1 and 4.1 respectively send S'1 and S'2 (uplink mode).

In step St"7, when times $t_1$ and $t_2$ calculated in each period stabilize over a predetermined number of periods, for example over 5 periods, then network entity 5.0 emits signals PRS1 and PRS2 (downlink mode) or sends a message in the control plane to user terminal 1 in order to trigger the sending by user terminal 1 of reference signals RS1 and RS2 to network entity 5.0 (uplink mode).

In step St"8, network entity 5.0 receives the RSTD measurement of the time difference between the time of reception of PRS1 and PRS2 as measured by user terminal 1 (downlink mode), or network entity 5.0 measures the transmission time of RS1 and RS2 (uplink mode).

In step St"9, network entity 5.0 sends the RSTD to server 7 or the transmission time of RS1 and RS2.

In step St" 10, network entity 5.0 sends $t_1$ and $t_2$ to server 7, possibly at the request of server 7. Server 7 can thus determine the position of user terminal 1 on the basis of the corrected RSTD and possibly on other corrected RSTD measurements obtained separately or on the basis of the transmission times of RS1 and RS2.

The invention claimed is:

1. A method of transmitting signals used to estimate the position of a user terminal, the method comprising:

transmitting a first signal between a network entity and the user terminal by traveling through a radio unit, the first signal enabling a measurement relating to a transmission travel time between the network entity and the user terminal via the radio unit; and transmitting a second signal between the network entity and the radio unit, the second signal enabling a measurement of a transmission travel time between the network entity and the radio unit;

wherein at least one value of a transmission condition of the second signal, termed the second value, is dependent on a value of a transmission condition of the first signal, termed the first value, wherein the second signal is a signal among a set of signals sent by the network entity to the radio unit and which are intended to enable measurement of the transmission travel time between the network entity and the radio unit and wherein the second signal is selected as having the second value that is the most dependent on the first value.

2. The method according to claim 1, wherein transmitting the first signal is sending the first signal by the network entity towards the user terminal, and transmitting the second signal is sending the second signal by the network entity towards the radio unit.

3. The method according to claim 1, wherein transmitting the first signal is receiving, by the network entity, the first signal originating from the user terminal, and transmitting the second signal is receiving, by the network entity, the second signal originating from the radio unit.

4. The method according to claim 2, wherein a delay between sending the first signal and sending the second signal is less than a threshold.

5. The method according to claim 3, wherein a delay between receiving the first signal and receiving the second signal is less than a threshold.

6. A method of transmitting signals used to estimate the position of a user terminal, the method comprising:

transmitting a first signal between a network entity and the user terminal by traveling through a radio unit, the first signal enabling a measurement relating to a transmission travel time between the network entity and the user terminal via the radio unit; and transmitting a second signal between the network entity and the radio unit, the second signal enabling a measurement of a transmission travel time between the network entity and the radio unit;

wherein at least one value of a transmission condition of the second signal, termed the second value, is dependent on a value of a transmission condition of the first signal, termed the first value, wherein the network entity periodically sends signals to the radio unit, each of these signals being intended to enable the measurement of a transmission travel time over the portion of the communication network between the network entity and the radio unit, the network entity sending the first signal and the second signal when the measurements of the transmission travel time of the periodically-sent signals are stable.

7. A method of transmitting signals used to estimate the position of a user terminal, the method comprising:

transmitting a first signal between a network entity and the user terminal by traveling through a radio unit, the first signal enabling a measurement relating to a transmission travel time between the network entity and the user terminal via the radio unit; and transmitting a second signal between the network entity and the radio unit, the second signal enabling a measurement of a transmission travel time between the network entity and the radio unit;

wherein at least one value of a transmission condition of the second signal, termed the second value, is dependent on a value of a transmission condition of the first signal, termed the first value, wherein the network entity sends the first signal and wherein the first signal comprises the measurement of the transmission travel time of the second signal over the portion of a communication network between the network entity and the radio unit.

8. The method according to claim 1, further comprising sending, by the network entity and towards a geolocation server, a message comprising information relating to a transmission travel time of the second signal between the network entity and the radio unit.

9. A method of transmitting signals used to estimate the position of a user terminal, the method comprising:

transmitting a first signal between a network entity and the user terminal by traveling through a radio unit, the first signal enabling a measurement relating to a transmission travel time between the network entity and the user terminal via the radio unit; and transmitting a second signal between the network entity and the radio unit, the second signal enabling a measurement of a transmission travel time between the network entity and the radio unit;

wherein at least one value of a transmission condition of the second signal, termed the second value, is dependent on a value of a transmission condition of the first signal, termed the first value, wherein a portion of the communication network between the network entity and the radio unit comprises a transport network device, and wherein the transport network device participates in the transmission of the first signal and second signal by applying, for each of these transmissions, a same value of a transmission parameter and/or a same routing and/or dedicated resources, the method further comprising sending a message by the network entity towards the transport network device, the message comprising an item of information among a transmission parameter value to be applied, a time period during which the value of the transmission parameter is to be applied to signals originating from or intended for the network entity, information which allows identifying the first and second signal, and resources used for the transmission of the first and second signal.

10. The method according to claim 9, wherein the transmission parameter is a priority level.

11. A non-transitory computer-readable storage medium having stored thereon a computer program comprising instructions for causing a processor to implement the method according to claim 1.

* * * * *